(12) United States Patent
Kurata et al.

(10) Patent No.: US 8,920,017 B2
(45) Date of Patent: Dec. 30, 2014

(54) SURFACE LIGHT SOURCE DEVICE

(71) Applicant: OMRON Corporation, Kyoto-shi (JP)

(72) Inventors: Gouo Kurata, Tsurugashima (JP); Koichi Takemura, Konan (JP); Kazuhide Hirota, Moriyama (JP); Jun Kishimoto, Ogaki (JP); Masayuki Shinohara, Nagaokakyou (JP)

(73) Assignee: OMRON Corporation, Kyoto (JP)

( * ) Notice: Subject to any disclaimer, the term of this patent is extended or adjusted under 35 U.S.C. 154(b) by 4 days.

(21) Appl. No.: 13/775,944

(22) Filed: Feb. 25, 2013

(65) Prior Publication Data

US 2013/0242613 A1    Sep. 19, 2013

(30) Foreign Application Priority Data

Mar. 15, 2012    (JP) ................... 2012-058722

(51) Int. Cl.
*F21V 7/04*    (2006.01)
*F21V 8/00*    (2006.01)

(52) U.S. Cl.
CPC .................................... *G02B 6/0035* (2013.01)
USPC ........................... 362/613; 362/606; 362/623

(58) Field of Classification Search
USPC .......................... 362/613, 619, 623, 626, 606
See application file for complete search history.

(56) References Cited

U.S. PATENT DOCUMENTS

| | | | | |
|---|---|---|---|---|
| 7,969,531 B1 * | 6/2011 | Li et al. | ............................ | 349/65 |
| 8,011,819 B2 * | 9/2011 | Yue | ................................ | 362/615 |
| 2004/0136173 A1 * | 7/2004 | Tsai | ................................. | 362/31 |
| 2007/0242475 A1 * | 10/2007 | Minobe et al. | ................ | 362/608 |
| 2011/0176089 A1 | 7/2011 | Ishikawa et al. | | |
| 2013/0322111 A1 * | 12/2013 | Nishitani et al. | .............. | 362/603 |

FOREIGN PATENT DOCUMENTS

| | | |
|---|---|---|
| JP | 11-281976 A | 10/1999 |
| JP | 2001-210120 A | 8/2001 |
| JP | 2004-053665 A | 2/2004 |
| KR | 10-2007-0100527 A | 10/2007 |
| KR | 10-2011-0083493 A | 7/2011 |

OTHER PUBLICATIONS

Japanese Office Action for Application No. 2012-058722 issued Jan. 21, 2014 (5 Pages).
Korean Office Action for Application No. 10-2013-0021097 issued Jan. 22, 2014 (3 Pages).

* cited by examiner

*Primary Examiner* — Evan Dzierzynski
(74) *Attorney, Agent, or Firm* — Nutter McClennen & Fish LLP; John J. Penny, Jr.

(57) ABSTRACT

A variation in luminance is reduced near a light source without decreasing intensity of a light exit pattern. A light source is disposed and a light exit pattern is formed. The light exit pattern reflects light guided in a light guide plate and outputs the light. In inclined angles of tangents of the light exit patterns in a section passing through a center axis of the light exit pattern, a largest inclined angle of the tangent is defined as a maximum inclined angle of the light exit pattern. At this time, in the light exit pattern provided in the light guide plate, the maximum inclined angle is decreased with increasing distance from a light incident surface in a region near the light incident surface, and the maximum inclined angle is decreased or kept constant with increasing distance from the light incident surface in a region distant from the region near the light incident surface.

5 Claims, 12 Drawing Sheets

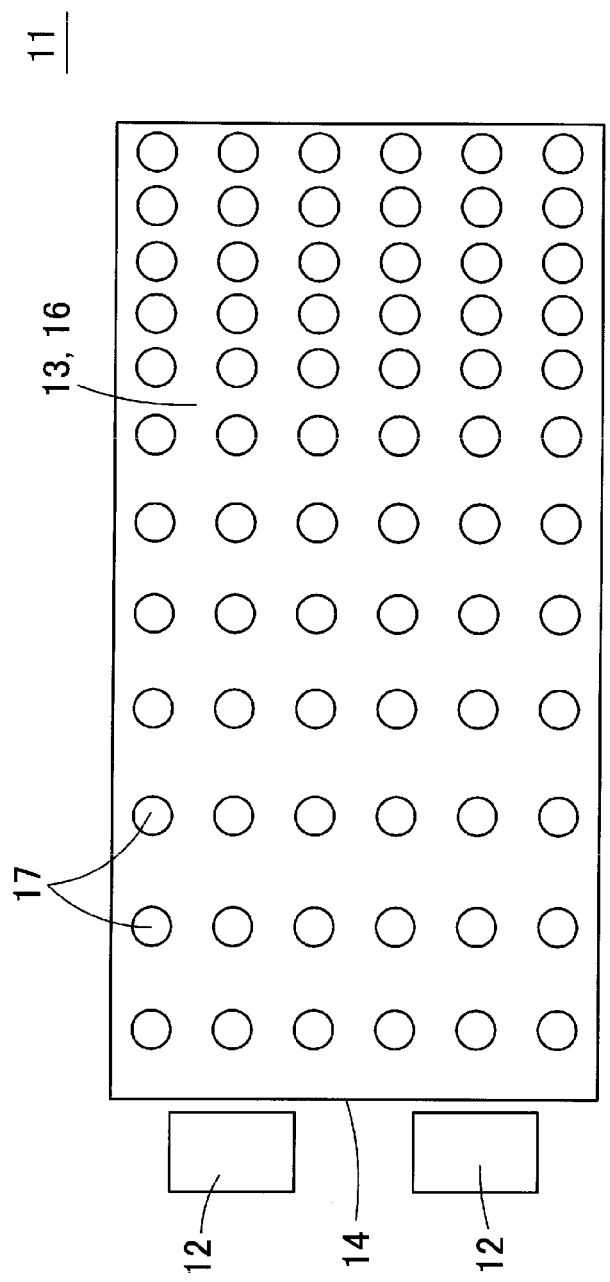
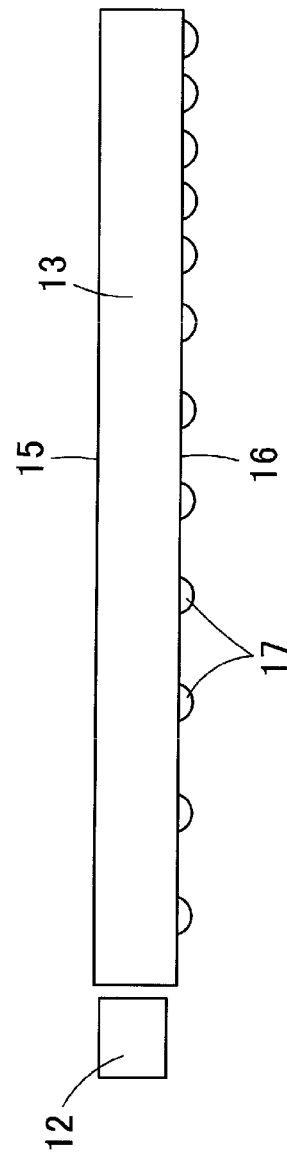
FIG. 1A
FIG. 1B

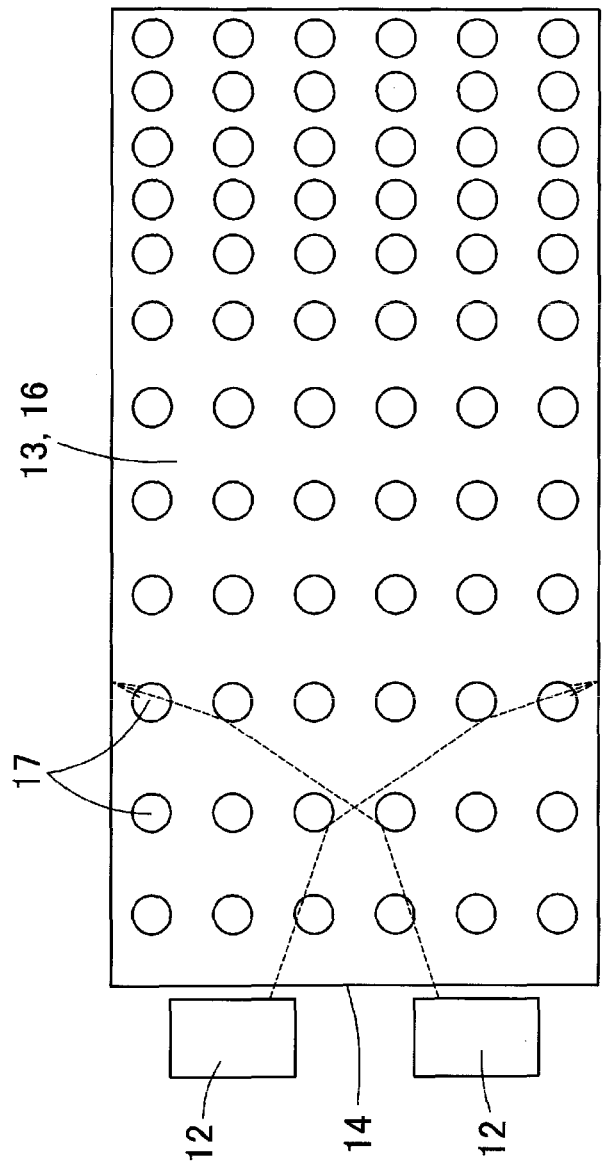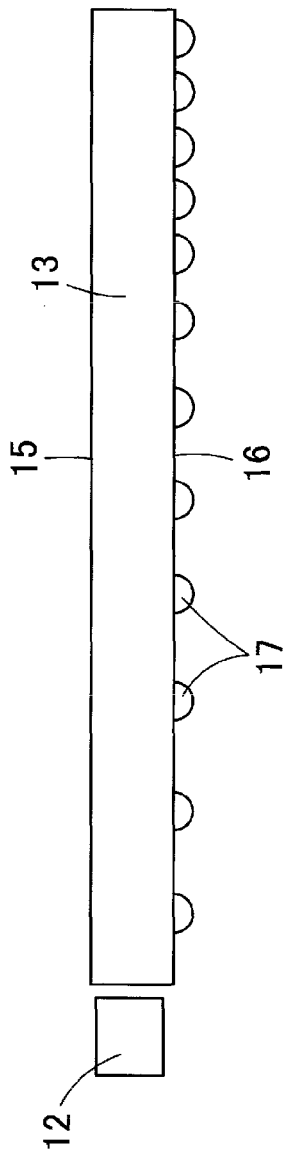
FIG. 3A
FIG. 3B

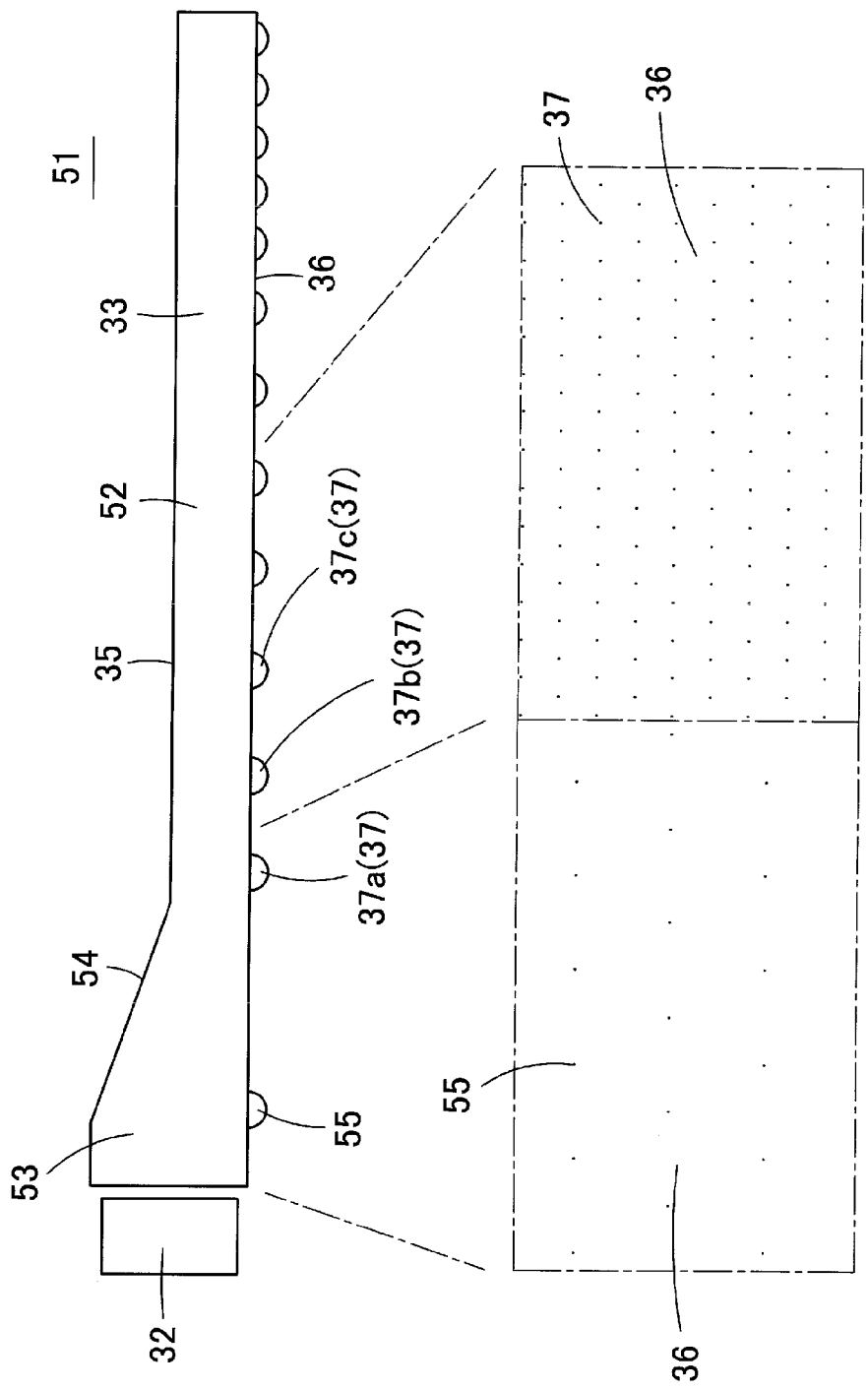

SURFACE LIGHT SOURCE DEVICE

Priority is claimed under 35 U.S.C. §119 to Japanese Patent Application No. JP2012-058722 filed on Mar. 15, 2012, which is hereby incorporated by reference in its entirety.

BACKGROUND

1. Technical Field

The present invention relates to a surface light source device, and specifically to a surface light source device that is used as a backlight of a liquid crystal display.

2. Related Art

FIG. 1A is a view illustrating a surface light source device of a conventional example when the surface light source device is viewed from a lower surface side. FIG. 1B is a side view illustrating the surface light source device of the conventional example. In a surface light source device 11, a plurality of light sources 12 are disposed while facing a light incident surface 14 of a light guide plate 13. The light guide plate 13 is formed into a flat-plate shape using a high-refractive-index transparent resin, and a plurality of spherical light exit patterns 17 are projected on an opposite surface (a lower surface 16) of a light exit surface 15. For example, Japanese Unexamined Patent Publication No. 11-281976 discloses such a surface light source device.

FIGS. 2A and 2B illustrate the case where a maximum inclined angle of the light exit pattern 17 is decreased in the surface light source device 11 in FIGS. 1A and 1B. As used herein, the maximum inclined angle of the light exit pattern refers to a largest inclined angle in inclined angles of tangents drawn to the surface of the light exit pattern in a section passing through a center axis of the light exit pattern or a section parallel to the section passing through the center axis of the light exit pattern. For example, in the spherical light exit pattern in FIGS. 1A and 1B and FIGS. 2A and 2B, the maximum inclined angle is an inclined angle of the tangent drawn to an end of the light exit pattern 17 with respect to a horizontal surface. As illustrated in FIGS. 2A and 2B, for the small maximum inclined angle of the light exit pattern 17, the light incident to the light guide plate 13 from the light source 12 is hardly scattered in each direction by the light exit pattern 17, and therefore a light mixing effect is insufficiently obtained. Therefore, a portion in front of the light source 12 brightens up, a dark portion D is generated in a region between the light sources 12, and a variation in luminance is generated near the light source 12. At the same time, the light exit pattern 17 has high intensity.

FIGS. 3A and 3B illustrate the case where the maximum inclined angle of the light exit pattern 17 is increased in the surface light source device 11 in FIGS. 1A and 1B. As illustrated in FIGS. 3A and 3B, for the large maximum inclined angle of the light exit pattern 17, the light incident to the light guide plate 13 from the light source 12 is easily scattered in each direction by the light exit pattern 17, and therefore the light mixing effect is enhanced. Therefore, the variation in luminance is hardly generated near the light source 12. At the same time, when the maximum inclined angle of the light exit pattern 17 is increased to an extent that the variation in luminance is inconspicuous, an aspect ratio of the light exit pattern 17 is increased to decrease the intensity. In the case where the surface light source device is used as a liquid crystal display device, the light exit pattern 17 may possibly be crushed when the surface of the liquid crystal display device is pressed by a finger.

Accordingly, there is a practical problem in both the cases where the maximum inclined angle of the light exit pattern 17 is increased and decreased.

SUMMARY

The present invention has been made in view of the above technical problems, and an object of at least one embodiment thereof is to provide a surface light source device that can reduce variation in luminance near a light source without decreasing intensity of a light exit pattern in the surface light source device in which the light exit pattern that outputs light through a light exit surface is formed in a light guide plate.

In accordance with one aspect of at least one embodiment of the present invention, a surface light source device includes: a light source; and a light guide plate that guides light emitted from the light source through a light incident surface to output the light emitted to an outside through a light exit surface, wherein the light guide plate includes a light exit pattern on at least one of a surface where light exits and an opposite surface thereof, the light exit pattern outputting the light in the light guide plate through the light exit surface, and a maximum inclined angle in inclined angles of tangents of the light exit patterns in a section passing through a center axis of the light exit pattern is decreased with increasing distance from the light incident surface in a region near the light incident surface, and the maximum inclined angle is decreased or kept constant with increasing distance from the light incident surface in a region away from the region near the light incident surface.

In the surface light source device of at least one embodiment of the present invention, the maximum inclined angle of the light exit pattern is relatively increased in the region near the light incident surface, because the maximum inclined angle of the light exit pattern is wholly decreased with increasing distance from the light incident surface. Therefore, in the region near the light incident surface, the degree of light scattering is increased so that variation in luminance is hardly generated. In the region distant from the light incident surface, since the maximum inclined angle of the light exit pattern is decreased, the intensity of the light exit pattern can be enhanced, and the light exit pattern is hardly crushed.

In the surface light source device according to at least one embodiment of the present invention, the largest maximum inclined angle in the maximum inclined angles of the light exit pattern ranges from 25° to 40°. Accordingly, the variation in luminance can be reduced near the light incident surface to obtain good visual quality.

In the surface light source device according to at least one embodiment of the present invention, a plurality of light sources are desirably disposed while facing the light incident surface, and the maximum inclined angle of the light exit pattern located in a region at a distance from the light exit pattern located closest to the light incident surface, the distance being equal to an interval between two of the plurality of light sources, is desirably larger than a minimum value of the maximum inclined angles of all the light exit patterns. When the maximum inclined angle of the light exit pattern reaches the minimum value within the distance from the light exit pattern located closest to the light incident surface, the degree of light scattering is insufficient, and the effect to suppress the variation in luminance is insufficiently obtained in the region near the light incident surface.

In the surface light source device according to at least one embodiment of the present invention, the maximum inclined angle of the light exit pattern changes smoothly with increasing distance from the light incident surface. Accordingly, the change of the light exit pattern becomes inconspicuous, and the light exit pattern is hardly crushed.

In the surface light source device according to at least one embodiment of the present invention, the maximum inclined angle of the light exit pattern is kept constant from a position to an end portion, and the position and the end portion being located on a side of the light guide plate farther away from the light incident surface. Accordingly, the maximum inclined angle of the light exit pattern can be prevented from being excessively decreased in the region distant from the light incident surface.

In the surface light source device according to at least one embodiment of the present invention, in a surface located on a side opposite from a surface in which the light exit pattern is formed in the light guide plate, a region facing the light exit pattern is formed by a smooth surface or a coarse surface having arithmetic average roughness of 0.1 μm or less. Accordingly, the function of scattering the light can be added or removed from the surface located on the side opposite from the surface in which the light exit pattern is formed.

Many variations can be made in the present invention using various combinations of the elements described herein.

BRIEF DESCRIPTION OF THE DRAWINGS

FIG. 1A is a schematic bottom view illustrating a surface light source device of a conventional example;

FIG. 1B is a schematic side surface illustrating the surface light source device of the conventional example;

FIGS. 3A and 3B are a schematic bottom view and a schematic side view illustrating the conventional surface light source device in which the maximum inclined angle of the light exit pattern is increased;

FIG. 12 is a schematic side view illustrating a surface light source device according to a fourth embodiment of the present invention and enlarged two points of a rear surface.

DETAILED DESCRIPTION

Hereinafter, preferred embodiments of the present invention will be described in detail with reference to the accompanying drawings. However, the present invention is not limited to the following embodiments, and various design changes can be made without departing from the scope of the present invention.

First Embodiment

Figures 2A, 2B:
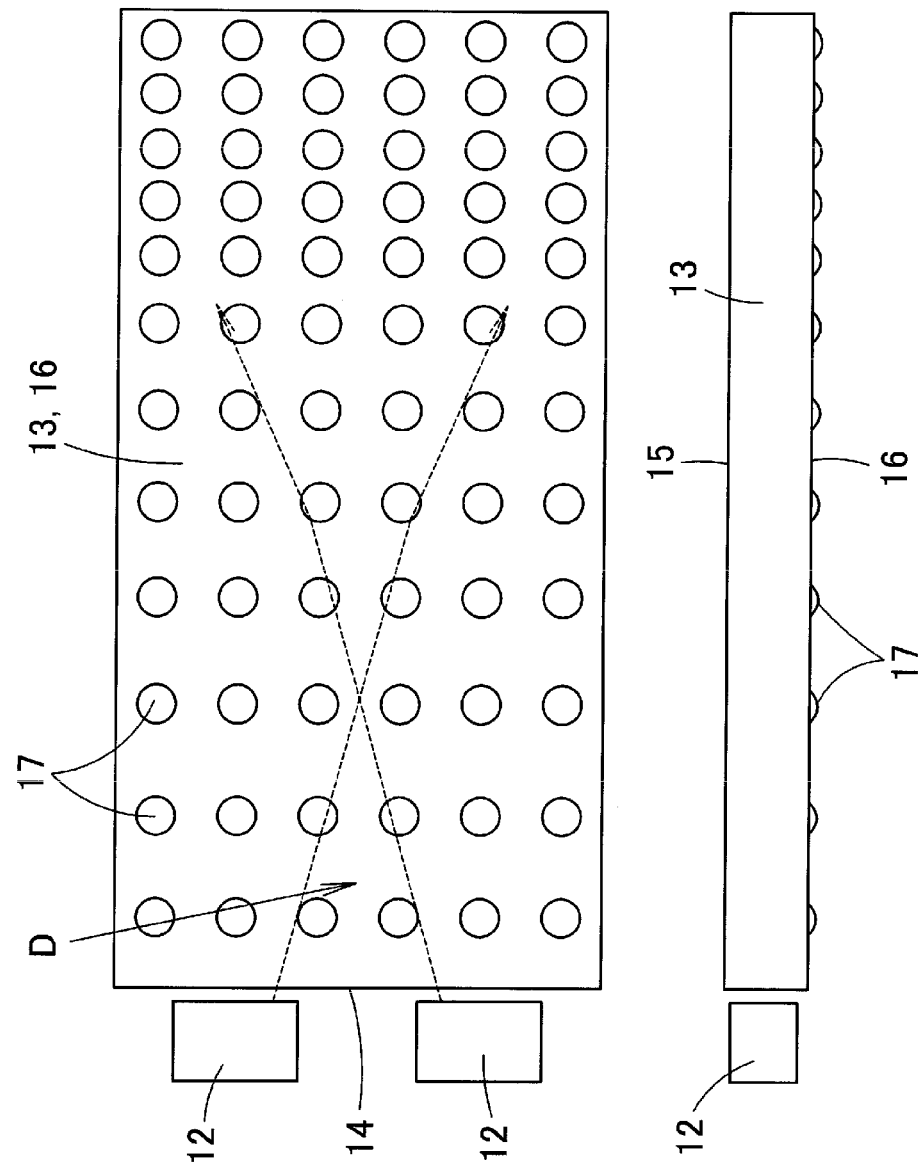
FIGS. 2A and 2B are a schematic bottom view and a schematic side view illustrating the conventional surface light source device in which a maximum inclined angle of a light exit pattern is decreased.
Figure 4A:
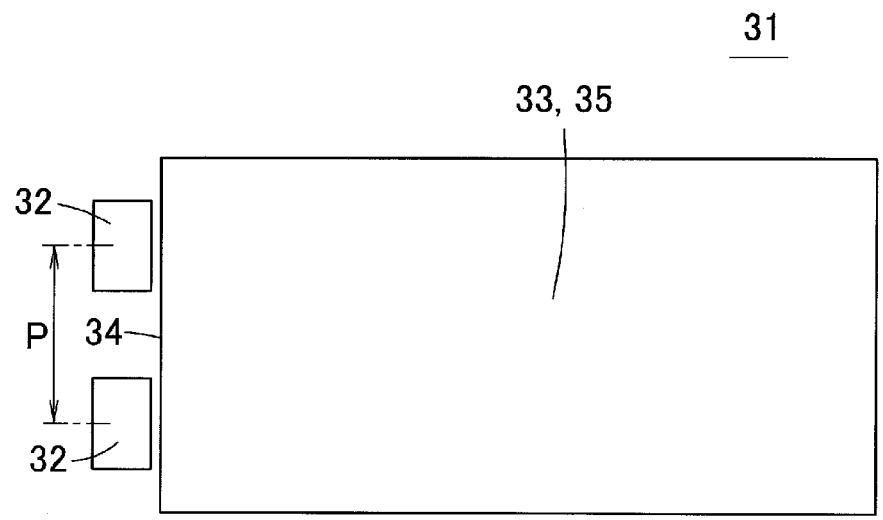
FIG. 4A is a schematic plan view illustrating a surface light source device according to a first embodiment of the present invention.
Figure 4B:
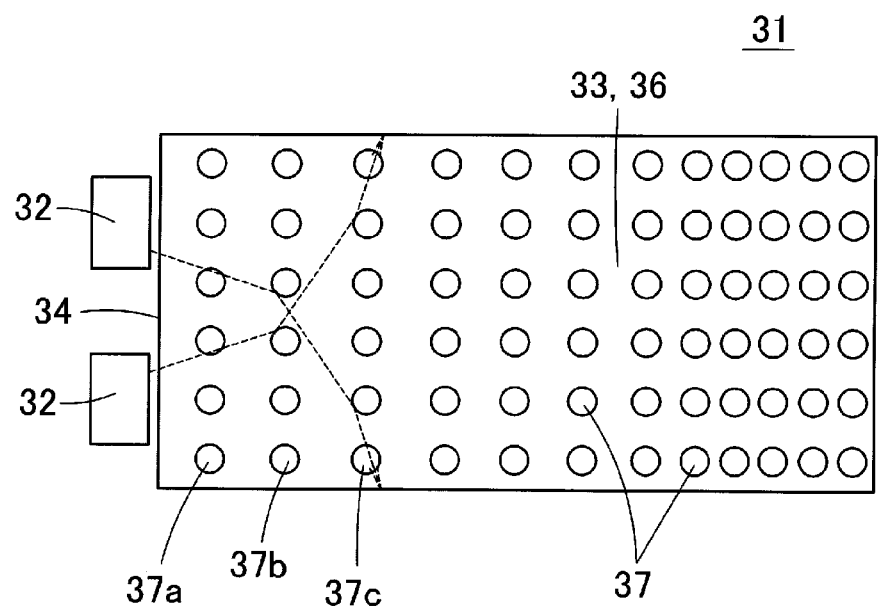
FIG. 4B is a schematic bottom view illustrating the surface light source device of the first embodiment of the present invention.

A surface light source device 31 according to a first embodiment of the present invention will be described below. FIG. 4A is a schematic plan view of the surface light source device 31 of the first embodiment, and FIG. 4B is a schematic bottom view of the surface light source device 31.

The surface light source device 31 includes a light source 32 and a light guide plate 33. The light source 32 incorporates therein one or a plurality of LEDs (chips). In the light source 32, the LED emits light to output white light from a light exit window (an emission surface) of a front surface.

In the light guide plate 33, an upper surface and a lower surface are formed into plate shapes parallel to each other. The light guide plate 33 is integrally formed using high-refractive-index transparent resins, such as an acrylic resin, a polycarbonate resin (PC), a cycloolefin-based material, and polymethylmethacrylate (PMMA). The upper surface of the light guide plate 33 constitutes a light exit surface 35. As illustrated in FIG. 4A, in the first embodiment, the light exit surface 35 is a smooth plane.

A light incident surface 34 of the light guide plate 33 is perpendicular to the light exit surface 35, and the light sources 32 are arrayed at a constant interval P in a position facing the light incident surface 34.

As illustrated in FIG. 4B, many micro light exit patterns 37 are densely formed in a lower surface 36 of the light guide plate 33. In the light exit pattern 37, distribution density (number density) is gradually increased with increasing distance from the light incident surface 34. The light exit pattern 37 is distributed with relatively low density in the vicinity of the light incident surface 34, and distributed with relatively high density on the side farther away from the light incident surface 34.

Figure 5A:
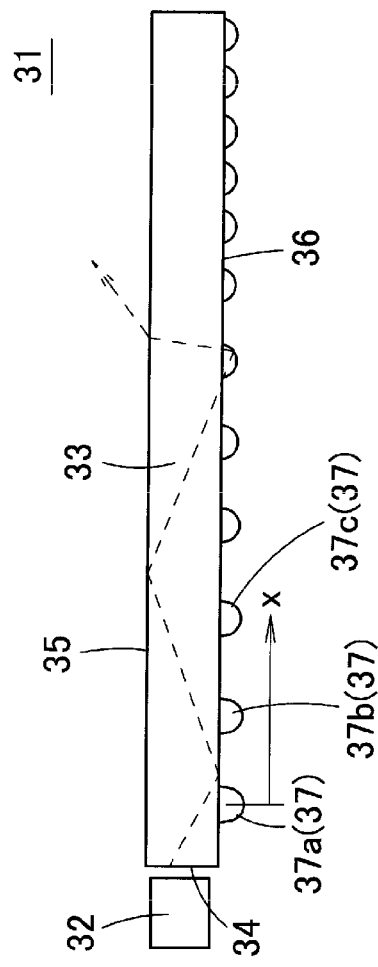
FIG. 5A is a schematic side view of the surface light source device in FIGS. 4A and 4B.
Figure 5B:
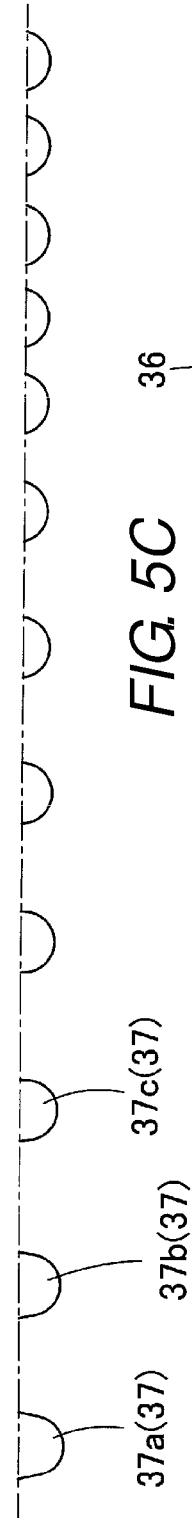
FIG. 5B is an enlarged side view illustrating a light exit pattern of the surface light source device in FIG. 5A.
Figure 5C:
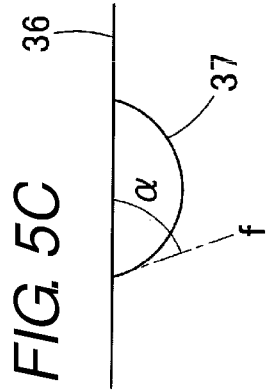
FIG. 5C is a view illustrating a maximum inclined angle of the light exit pattern.

FIG. 5A is a schematic side view of the surface light source device 31, and FIG. 5B is an enlarged view illustrating the light exit pattern 37 provided in the lower surface of the light guide plate 33. A shape of the light exit pattern 37 gradually changes from the side of the light incident surface 34 toward the opposite side as illustrated by light exit patterns 37a, 37b, 37c, . . . in FIG. 5B. That is, in a region near the light incident surface 34, a maximum inclined angle of the light exit pattern 37 is gradually decreased, and an aspect ratio of the light exit pattern 37 is also gradually decreased. In a region distant from the region near the light incident surface 34, the maximum inclined angle of the light exit pattern 37 is gradually decreased or kept constant, and the aspect ratio of the light exit pattern 37 is also gradually decreased or kept constant. As used herein, the maximum inclined angle of the light exit pattern 37 means a maximum inclined angle $\alpha$ among inclined angles of a tangent drawn to a surface of the light exit pattern in FIG. 5C in a section passing through a center axis of the light exit pattern. For example, in the case of the spherical light exit pattern in FIG. 5C, the inclined angle formed between a horizontal surface and a tangent f drawn to an end of the light exit pattern 37 becomes the maximum inclined angle $\alpha$.

Because the surface light source device 31 of the first embodiment has the above structure, as illustrated in FIG. 5A, the light emitted from the light source 32 is incident to the light guide plate 33 from the light incident surface 34. The light incident to the light guide plate 33 is guided while being repeatedly reflected by the upper surface and the lower surface of the light guide plate 33, and part of the light reflected by the light exit pattern 37 is output to the outside from the light exit surface 35. When viewed from a direction perpendicular to the light exit surface 35, the light reflected by the light exit pattern 37 is horizontally scattered as illustrated in FIG. 4B. Particularly, in the light scattered by the light exit pattern 37 in the region near the light incident surface 34, the light guide direction is largely bent because the light exit pattern 37 has large maximum inclined angle in the region near the light incident surface 34. Therefore, the light mixing effect is enhanced in the region near the light incident surface 34, the variation in luminance is reduced in the region near the light incident surface 34, the dark portion between the light sources 32 can be prevented. On the other hand, in the region distant from the region near the light incident surface 34, since the maximum inclined angle of the light exit pattern 37 is decreased while the aspect ratio of the light exit pattern 37 is also decreased, the light exit pattern 37 is hardly crushed even if a pressure is applied to the surface light source device 31.

Because the maximum inclined angle of the light exit pattern 37 changes smoothly according to distance from the light incident surface 34, a sharp difference is not generated in a height of the light exit pattern 37, and the height of the light exit pattern 37 changes smoothly. Therefore, the change in height of the light exit pattern 37 is inconspicuous, and the light exit pattern 37 is hardly crushed.

In the surface light source device 31, in a region where a distance x (see FIG. 5A) from the light exit pattern 37a located closest to the light incident surface 34 is less than or equal to the interval P of light source 32, the maximum inclined angle $\alpha$ of the light exit pattern 37 is larger than a minimum value of the maximum inclined angle in all the light exit patterns 37. That is, when the distance from the light exit pattern 37a located closest to the light incident surface 34 is less than the interval P of light source 32, the maximum inclined angle $\alpha$ of the light exit pattern 37 is designed not to become the minimum value. When the maximum inclined angle $\alpha$ of the light exit pattern 37 reaches the minimum value with the distance x being within the interval P of the light source 32, a degree of light scattering is insufficient, and the effect to suppress the variation in luminance is insufficient in the region near the light incident surface 34.

Figure 6:
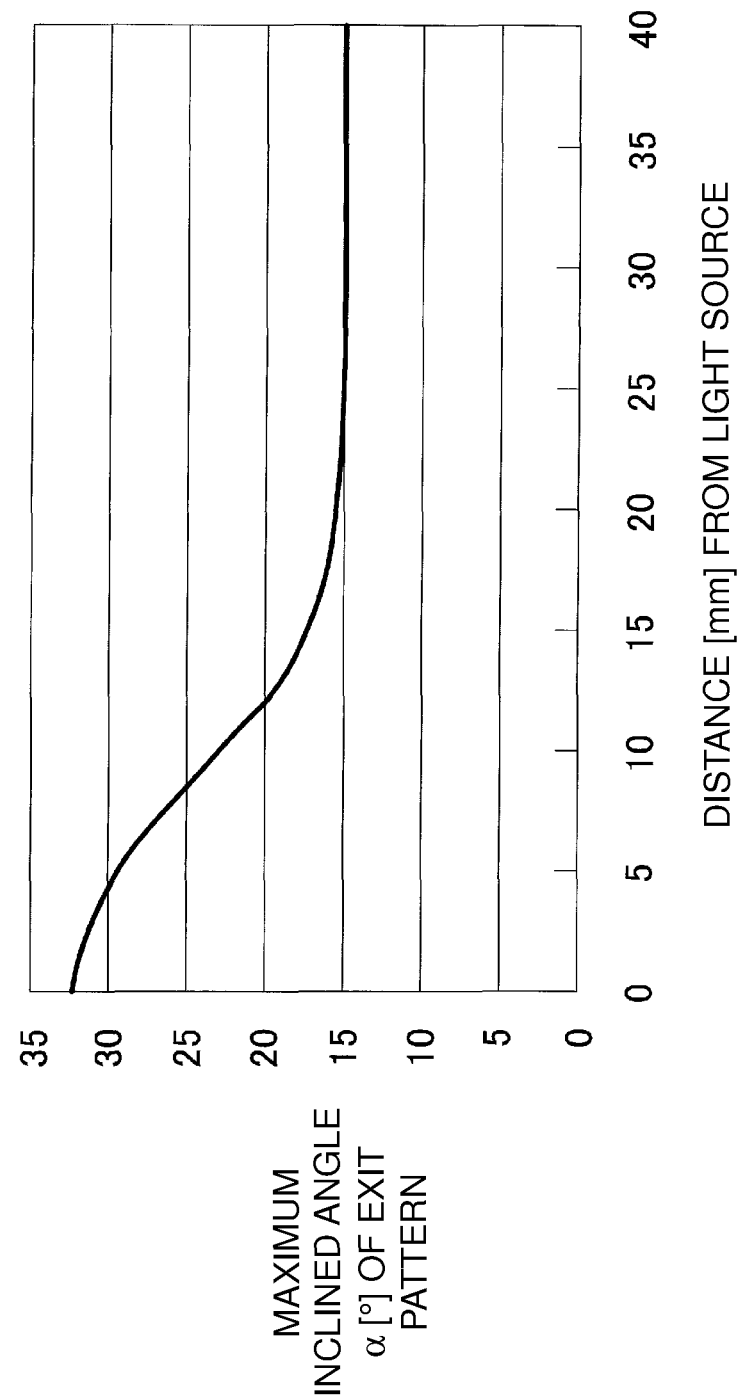
FIG. 6 is a view illustrating a relationship between a distance from a light source and the maximum inclined angle of the light exit pattern.

FIG. 6 illustrates an example of a change in maximum inclined angle $\alpha$ of the light exit pattern 37. In this example, the interval P of the light source 32 is set to 5.5 mm. The maximum inclined angle $\alpha$ of the light exit pattern 37 changes smoothly, and the maximum inclined angle $\alpha$ decreases smoothly up to about 20 mm away from the light source 32, which is far beyond the interval P of the light source 32. The maximum inclined angle $\alpha$ of the light exit pattern 37 is kept substantially constant at distances of about 20 mm or more from the light source 32.

In the surface light source device of the first embodiment, the light scattering effect is enhanced because the maximum inclined angle of the light exit pattern 37 is increased near the light source 32. As indicated by an arrow in FIG. 4B, because the light incident to the light guide plate 33 is largely scattered to enhance the light mixing effect in the vicinity of the light incident surface 34, the variation in luminance is decreased in the region near the light source 32, and the surface light source device brightens up evenly. On the other hand, although the maximum inclined angle of the light exit pattern 37 is decreased in the region distant from the light source 32, because of the high distribution density of the light exit pattern 37, the light can sufficiently be scattered and the surface light source device can evenly brighten up. The maximum inclined angle of the light exit pattern 37 is decreased with increasing distance from the light source 32, and the aspect ratio of the light exit pattern 37 is also decreased. Therefore, the light exit pattern 37 is hardly crushed by the pressure. Because the maximum inclined angle of the light exit pattern 37 is kept constant at a certain distance (about 20 µm) or farther, the maximum inclined angle of the light exit pattern 37 is not excessively decreased in an end portion on the opposite side of the light incident surface 34.

Figure 7:
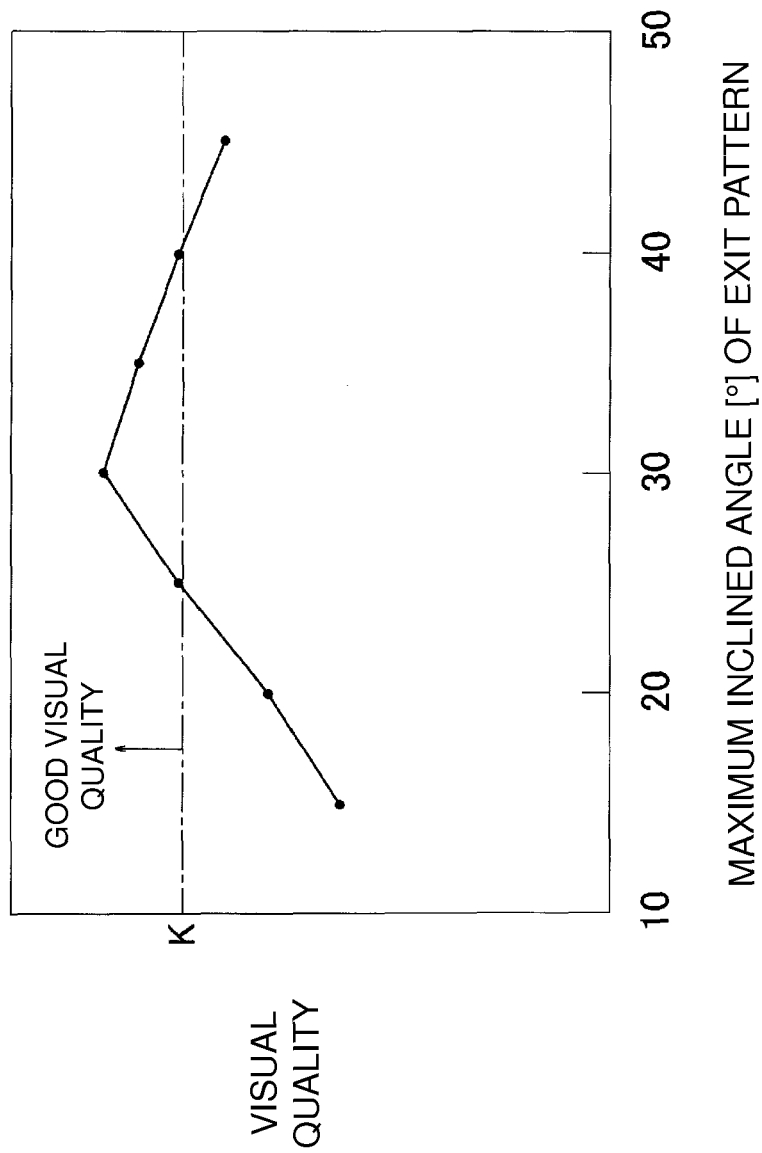
FIG. 7 is a view illustrating a relationship between the maximum inclined angle of the light exit pattern and visual quality of a light guide plate.

FIG. 7 illustrates a relationship between the largest maximum inclined angle in the maximum inclined angles of the light exit patterns 37 and the visual quality. A horizontal axis in FIG. 7 indicates the largest maximum inclined angle in the maximum inclined angles of the light exit patterns 37, namely, the maximum inclined angle of the light exit pattern 37 (37a) closest to the light incident surface 34. A vertical axis in FIG. 7 indicates the visual quality (the variation in luminance) in the region near the light source 32 evaluated by visual senses of plural persons. The visual quality as a product is sufficiently ensured when the visual quality is higher than a horizontal line K in FIG. 7, and is evaluated as problematic when it is lower than the horizontal line K. Accordingly, as can be seen from FIG. 7, it is found that the largest maximum inclined angle in the maximum inclined angles of the light exit patterns 37 ranges from 25° to 40°. When the largest maximum inclined angle is less than 25°, the dark portion is generated between the light sources due to the low light mixing effect, and when the largest maximum inclined angle is greater than 40°, the bright portion is generated between the light sources, thereby degrading the visual quality.

Figure 8A:
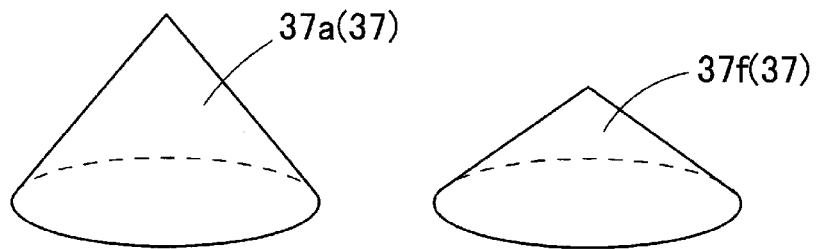
FIGS. 8A to 8D are views illustrating light exit patterns having various shapes.
Figure 8B:
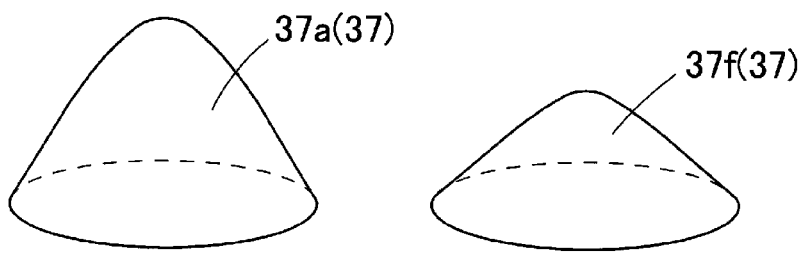
Figure 8C:
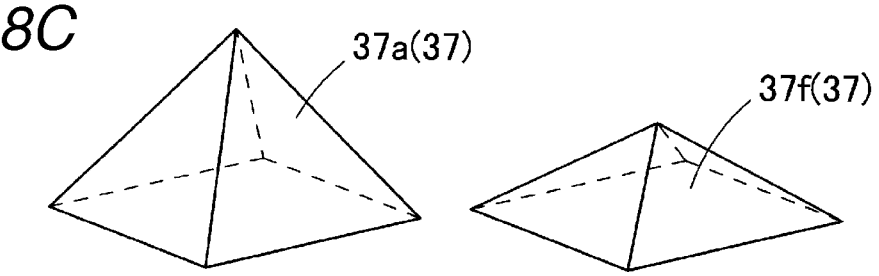
Figure 8D:
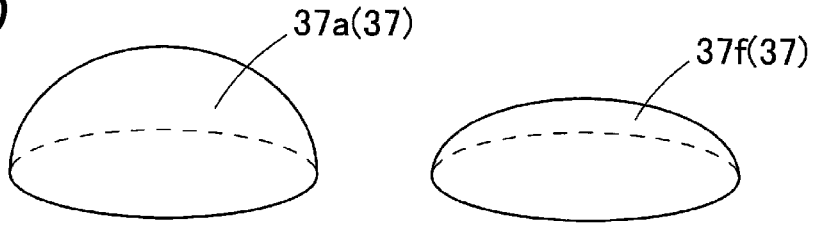

Although FIG. 5 illustrates the spherical light exit pattern 37, the light exit pattern 37 is not limited to the spherical shape. For example, FIG. 8A illustrates a light exit pattern 37a having the large maximum inclined angle and a light exit pattern 37f having the small maximum inclined angle in conical light exit patterns 37. FIG. 8B illustrates the light exit pattern 37a having the large maximum inclined angle and the light exit pattern 37f having the small maximum inclined angle in substantially conical light exit patterns 37 having round leading ends. FIG. 8C illustrates the light exit pattern 37a having the large maximum inclined angle and the light exit pattern 37f having the small maximum inclined angle in square-pyramid light exit patterns 37. FIG. 8D illustrates the light exit pattern 37a having the large maximum inclined angle and the light exit pattern 37f having the small maximum inclined angle in elliptical light exit patterns 37.

Figure 9A:
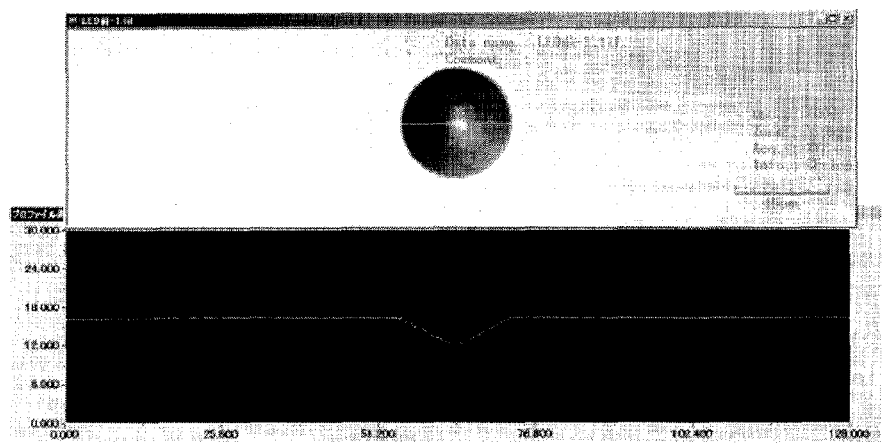
FIG. 9A is a view illustrating a light exit pattern having the large maximum inclined angle and a profile thereof.
Figure 9B:
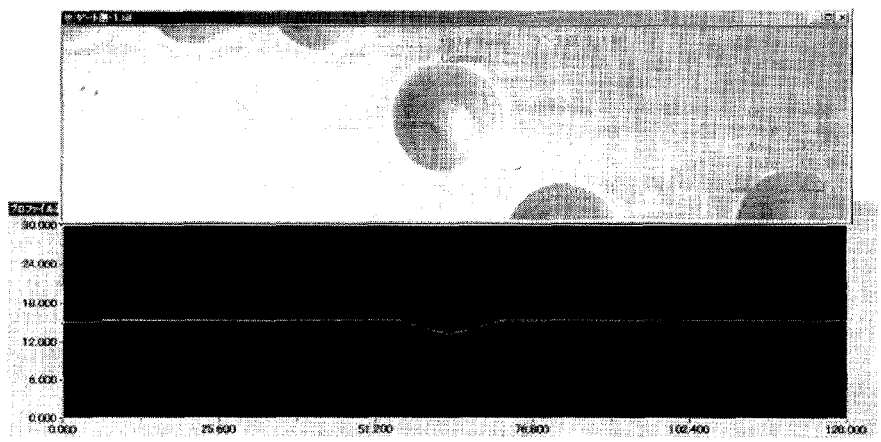
FIG. 9B is a view illustrating a light exit pattern having the small maximum inclined angle and a profile thereof.

FIG. 9A illustrates a microscope photograph of the light exit pattern having the large maximum inclined angle in the region near the light incident surface 34 and a sectional profile (unit is μm in horizontal and vertical scales) of the light exit pattern in the actually-produced light exit patterns 37. FIG. 9B illustrates a microscope photograph of the light exit pattern having the small maximum inclined angle in the region sufficiently away from the light incident surface 34 and a sectional profile (unit is μm in horizontal and vertical scales) of the light exit pattern in the actually-produced light exit patterns 37.

Second Embodiment

Figure 10A:
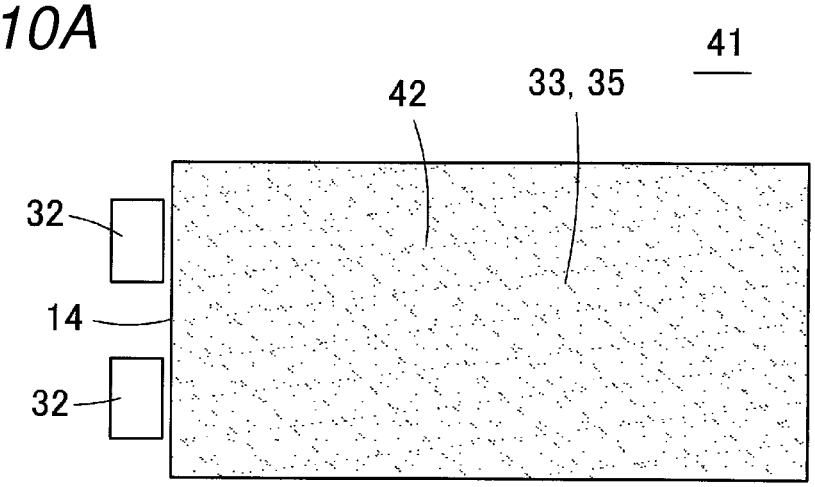
FIG. 10A is a schematic plan view illustrating a surface light source device according to a second embodiment of the present invention.
Figure 10B:
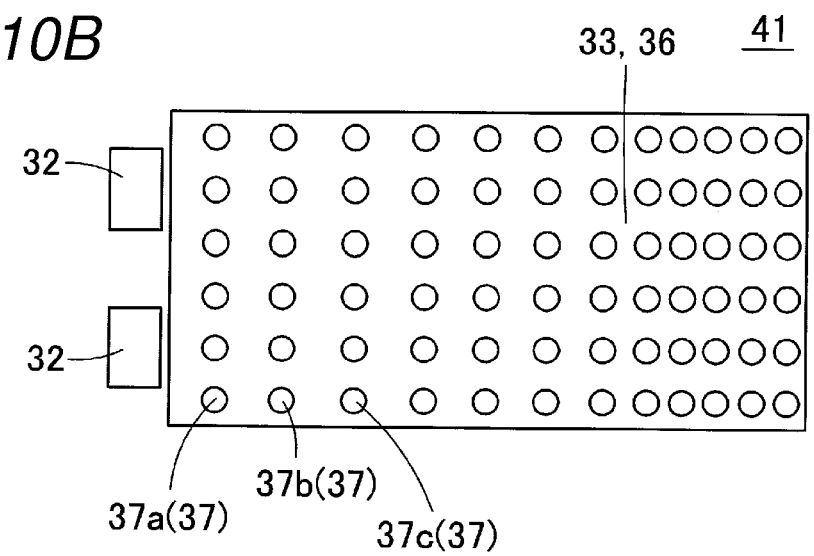
FIG. 10B is a schematic bottom view illustrating the surface light source device of the second embodiment of the present invention.
Figure 10C:
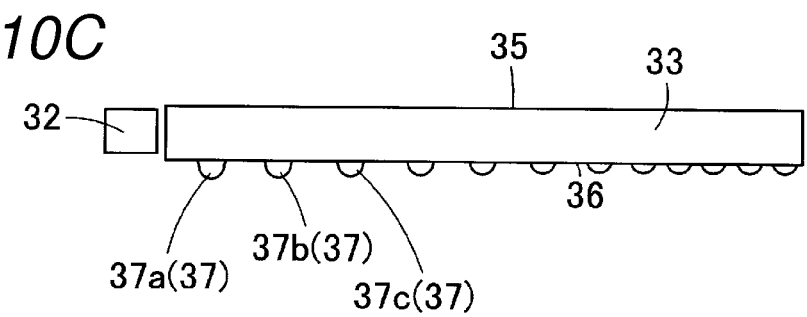
FIG. 10C is a schematic side view illustrating the surface light source device of the second embodiment of the present invention.

FIG. 10A is a schematic plan view illustrating a surface light source device 41 according to a second embodiment of the present invention. FIG. 10B is a schematic bottom view illustrating the surface light source device 41. FIG. 10C is a schematic side view illustrating the surface light source device 41. In the surface light source device 41 of the second embodiment, a coarse surface 42 having arithmetic average roughness (Ra) of 0.1 μm or less is used as the light exit surface 35. Because other configurations are identical to those of the surface light source device 31 of the first embodiment, the description is omitted by citing the reference numeral identical to that of the first embodiment (the same applies to other embodiments).

In the second embodiment, since the coarse surface 42 is used as the light exit surface 35, the light output from the light exit surface 35 can be scattered to widen the directional pattern. The reason for the restriction to the arithmetic average roughness (Ra) of 0.1 μm or less is that the front luminance is prevented from being excessively decreased due to the excessively large scattering on the coarse surface 42. In the second embodiment, it is not necessary to stack the diffusion sheet on the light exit surface 35. Therefore, the thickness of the surface light source device 41 can be reduced, and cost reduction can also be achieved.

Third Embodiment

Figure 11A:
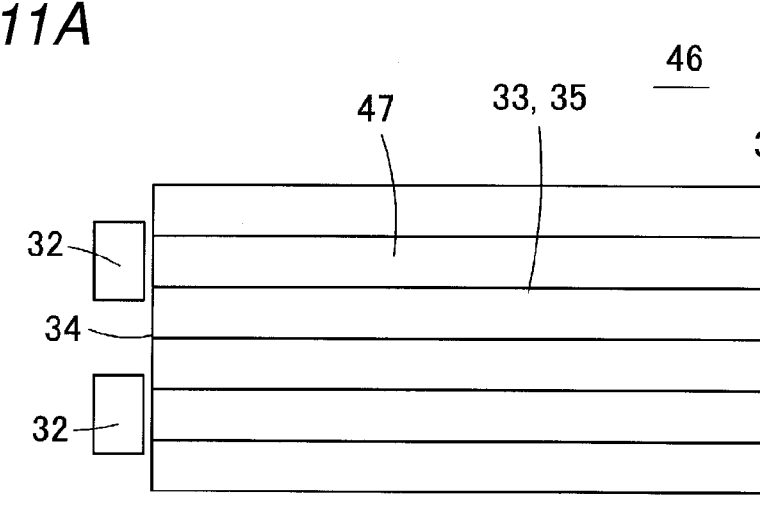
FIG. 11A is a schematic plan view illustrating a surface light source device according to a third embodiment of the present invention.
Figure 11D:
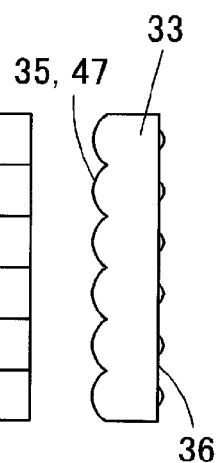
FIG. 11D is a schematic end view illustrating the surface light source device of the third embodiment of the present invention.
Figure 11B:
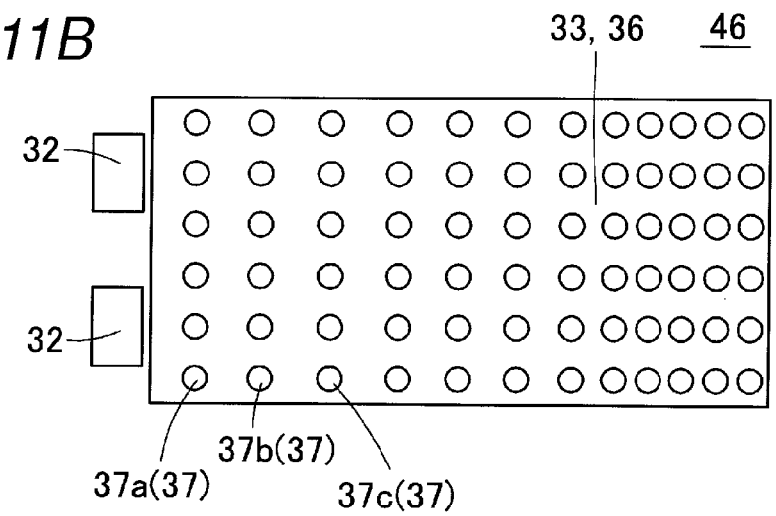
FIG. 11B is a schematic bottom view illustrating the surface light source device of the third embodiment of the present invention.
Figure 11C:
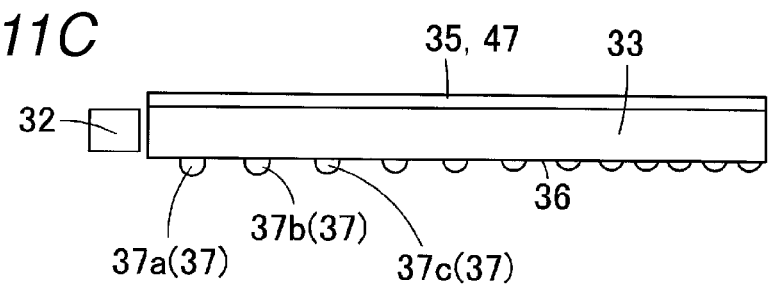
FIG. 11C is a schematic side view illustrating the surface light source device of the third embodiment of the present invention.

FIG. 11A is a schematic plan view illustrating a surface light source device 46 according to a third embodiment of the present invention. FIG. 11B is a schematic bottom view illustrating the surface light source device 46. FIG. 11C is a schematic side view illustrating the surface light source device 46. FIG. 11D is a schematic end view illustrating the surface light source device 46.

In the surface light source device 46 of the third embodiment, a lenticular lens 47 is formed on the light exit surface 35 of the light guide plate 33. In the lenticular lens 47, a lens surface extends in a direction perpendicular to the light incident surface 34, and the lens surface is arranged in a width direction. The directional pattern of the light output from the light exit surface 35 can be widened in the width direction of the light guide plate 33 by providing the lenticular lens 47.

Fourth Embodiment

FIG. 12 is a schematic side view illustrating a surface light source device 51 according to a fourth embodiment of the present invention. In the light guide plate 33 of the surface light source device 51 of the fourth embodiment, a light introduction part 53 is provided in an end surface of a thin-plate-like light guide plate body 52 so as to be continuously joined to the light guide plate body 52.

The light introduction part 53 is a thick, substantially wedge-shaped portion in the light guide plate 33, and the light source 32 is disposed so as to face the light incident surface 34 that is the end surface of the light introduction part 53. The thickness of the end surface of the light introduction part 53 is equal to or greater than a height of the light exit window of the light source 32.

An inclined surface 54 is formed in the upper surface (a surface on the same side as the light exit surface 35) of the light introduction part 53. The inclined surface 54 is inclined from the portion having the maximum thickness near the light incident surface 34 toward the end of the light guide plate body 52. The band-like inclined surface 54 extends from one side edge of the light guide plate 33 to the other side edge.

In the surface light source device 51, the thickness of the end surface of the light introduction part 53 is equal to or greater than the height of the light exit window of the light source 32. Therefore, the light output from the light source 32 is efficiently incident to the light introduction part 53 from the light incident surface 34 to enhance the light use efficiency of the surface light source device 51. The light incident to the thick light introduction part 53 is reflected by the inclined surface 54 and the lower surface of the light introduction part 53, guided to the thin light guide plate body 52, and output from the light exit surface 35 of the light guide plate body 52. Therefore, in the fourth embodiment, the light use efficiency can be enhanced while the low profile of the surface light source device 51 (the light guide plate body 52) is achieved.

In the fourth embodiment, the light exit pattern 37 is formed in the lower surface of the light guide plate body 52, and a contact prevention pattern 55 is formed in the lower surface of the light introduction part 53. The light exit pattern 37 and the contact prevention pattern 55 may be formed into the same shape. However, the light exit pattern 37 has an area ratio of about 0.5% in the end portion on the light introduction part side while the contact prevention pattern 55 has the area ratio of about 0.1%. The contact prevention pattern 55 is provided in the light introduction part 53 to prevent the contact of only the light introduction part 53 with a lower member (for example, a reflecting sheet), and the area ratio of the contact prevention pattern 55 is smaller than the area ratio of the light exit pattern 37 to decrease the light that is reflected by the contact prevention pattern 55 and leaks from the light introduction part 53.

What is claimed is:

1. A surface light source device comprising:
a plurality of light sources disposed to face a light incident surface; and
a light guide plate that guides light emitted from the plurality of light sources through the light incident surface to output the light emitted to an outside through a light exit surface, wherein
the light guide plate includes light exit patterns on at least one of a surface where light exits and an opposite surface thereof, the light exit patterns outputting the light in the light guide plate to the outside through the light exit surface, and
wherein maximum inclined angles of the light exit patterns decrease with increasing distance from the light incident surface in a region near the light incident surface, and the maximum inclined angles of the light exit patterns decrease or remain constant with increasing distance from the light incident surface in a region distant from the region near the light incident surface, a maximum inclined angle of a light exit pattern being a maximum inclined angle among inclined angles of tangents drawn to surfaces of the light exit pattern in a section passing through a center axis of the light exit pattern, and the maximum inclined angles of the light exit patterns located in a region at a distance from the light exit pattern located closest to the light incident surface, the distance being equal to an interval between two of the plurality of light sources, are larger than a minimum value of the maximum inclined angles of all the light exit patterns.

2. The surface light source device according to claim 1, wherein largest maximum inclined angles in the maximum inclined angles of the light exit patterns range from 25 degrees to 40 degree.

3. The surface light source device according to claim 1, wherein the maximum inclined angles of the light exit patterns change in a stepwise manner with increasing distance from the light incident surface.

4. The surface light source device according to claim 1, wherein the maximum inclined angles of the light exit patterns remain constant from a position to an end portion, and the position and the end portion are located on a side of the light guide plate farther away from the light incident surface.

5. The surface light source device according to claim 1, wherein, in a surface located on a side opposite from a surface on which the light exit patterns are formed in the light guide plate, a region facing the light exit patterns is formed by a smooth surface or a coarse surface having an arithmetic average roughness of 0.1 μm or less.

* * * * *